US007769637B2

(12) United States Patent
Batoff

(10) Patent No.: US 7,769,637 B2
(45) Date of Patent: Aug. 3, 2010

(54) INVENTORY CONTROL AND BALANCING SYSTEM

(76) Inventor: Jeffrey Batoff, 750 Righters Mill Rd., Penn Valley, PA (US) 19072

( * ) Notice: Subject to any disclaimer, the term of this patent is extended or adjusted under 35 U.S.C. 154(b) by 2576 days.

(21) Appl. No.: 10/085,394

(22) Filed: Feb. 28, 2002

(65) Prior Publication Data

US 2004/0172335 A1 Sep. 2, 2004
US 2007/0239550 A9 Oct. 11, 2007

Related U.S. Application Data

(63) Continuation-in-part of application No. PCT/US01/30002, filed on Sep. 26, 2001.

(60) Provisional application No. 60/235,367, filed on Sep. 26, 2000, provisional application No. 60/268,854, filed on Feb. 15, 2001.

(51) Int. Cl.
*G06Q 30/00* (2006.01)
(52) U.S. Cl. ....................................................... 705/26
(58) Field of Classification Search .................... 705/26
See application file for complete search history.

(56) References Cited

U.S. PATENT DOCUMENTS

| 5,493,490 | A | * | 2/1996 | Johnson | 705/26 |
|---|---|---|---|---|---|
| 6,847,938 | B1 | * | 1/2005 | Moore | 705/26 |
| 2002/0004759 | A1 | * | 1/2002 | Bradford et al. | 705/26 |
| 2003/0023498 | A1 | * | 1/2003 | Benton | 705/26 |
| 2003/0055743 | A1 | * | 3/2003 | Murcko, Jr. | 705/26 |
| 2004/0098317 | A1 | * | 5/2004 | Postrel | 705/26 |

* cited by examiner

*Primary Examiner*—F. Zeender
*Assistant Examiner*—Christopher Buchanan
(74) *Attorney, Agent, or Firm*—Knoble Yoshida & Dunleavy, LLC

(57) ABSTRACT

A method for providing a plurality of users with the ability to engage in the swap of a plurality of items comprising the following: providing a system for the entry of a plurality of items into inventory of a system by a plurality of users; providing a fixed number of credits for each said item entered which can be then used to obtain other items in the system's inventory wherein the number of credits received for each item will be automatically set by the system depending on each item's characteristics and where the total number of credits allocated represent the total value of all entered items.

89 Claims, 3 Drawing Sheets

INVENTORY CONTROL AND BALANCING SYSTEM

CLAIM OF PRIORITY

This application is a continuation-in-part of International Application PCT/US01/30002, filed Sep. 26, 2001, which claims priority from U.S. Ser. No. 60/235,367 filed Sep. 26, 2000 and U.S. Ser. No. 60/268,854 filed Feb. 15, 2001.

FIELD OF THE INVENTION

The present invention is broadly directed to online e-commerce systems. Most particularly, the present invention is directed to e-commerce systems in which users utilize a system of virtual money to consummate transactions for items.

BACKGROUND OF THE INVENTION

The need to establish a new type of trading process, beyond the barter system, brought about the establishment of a medium of exchange (e.g., money). This evolved over the ages into modern day commerce with monetary exchanges, stock markets, retail outlets, swap meets, etc. However, many of the globally employed systems may not be as efficient, or as fair as possible, since they rely on third party interaction or are based around a set market style or process. The utopian vision of a marketplace would be where the utility of the marketplace allowed for an individual to achieve the most efficient and advantageous level of transaction negotiation, fairest market value, and protected and guaranteed clearing for a commodity or service.

Long ago, ancient people invented money by placing fixed values on certain items such as shells, beads, stones, and even salt, with ingots being the most common form of money. Ingots were clumps of precious metal in no particular shape or size with their worth depending on their mineral content and weight. Their value was high because these metals were hard to find and difficult to mine. The world monetary system has evolved from ingots and ancient coinage to wire transfers, debit and credit cards and from primitive barter to currency exchanges, stock markets and intertwined global markets.

The Internet and world wide web (WWW) provided the first true continuous world wide communications structure open to the individual. The Internet allows for new ways to address global commerce. There are several different methods in which commerce may be implemented as well as a vast variety of commodities and services that are in need of being traded. The concept of using the Internet as a marketplace or auction forum has been implemented in a number of forms. The current technology of using E-mail and a telephone for notification employed by existing firms in closed environments has a rather low entry threshold of complexity. This method can be duplicated quite easily and has limited or no room for evolution. However, digital technology lends itself quite readily to real-time high-volume transactions made by multiple participants using shared information. Businesses are moving to digital technologies and this leads to a need to invent new technologies and processes to fill the utility.

Accordingly, a number of commerce systems over the Internet have become well known in the art. Most of these systems operate on a post and match process; that is, the systems work by having a prospective buyer bid on an item, and if the bid matches the seller's specified selling price, the item is sold to the buyer. The bid and notification may not be processed in real time. Additionally, the seller does not have the ability to intervene once the exchange process has been initiated—once the offer for sale or exchange is made, the seller is isolated from the transaction until it is complete.

With the proliferation of Internet-based selling systems, there have been a number of residual problems, specifically, transactions involving the direct payment of money for products which may have a non-uniform value, i.e., where value is based upon subjective factors such as age or condition. The direct payment of money on the Internet has proven problematic, particularly where buyers and sellers must condition payment on the receipt and approval of such goods. There is a long felt need for improved systems for facilitating transactions on the Internet and particularly for streamlining a mechanism of exchange to facilitate, foster and encourage transactions while at the same time ensuring that inventory is desirable, available and in balance with trading power.

The present invention addresses this need in a novel way by awarding a fixed number of SwapCredits for each qualified item entered by a user and allowing the user to immediately use those credits to trade for other items on the system. And while the assignment of credits is no more unique than money itself, what distinguishes this system is that the user is instantaneously given credits for all qualified items listed which allows the system to work at "full velocity" through immediate trading. Users do not have to wait to send their items to other users in order to "earn" credits. The system is also designed to protect the users' trading power by maintaining a balance between inventory and credits so that neither is diluted.

SUMMARY OF THE INVENTION

In accordance with the invention, a method and system for providing a first end user with the ability to engage in the swap of at least one item with a at least a second end user comprising the following steps: entering a first item to be swapped in an inventory of the system by the first end user; determining and providing a fixed number of credits for said item by said system based upon the characteristics of said item which can then be used by the first end user to purchase a second item placed by said second end user.

In further embodiments, system maintains a balance between the items of inventory and the total number of credits of all end users combined. The balance may be maintained such that any time an item is removed from the inventory of the system, the equivalent number of credits must also be removed from the account of an end user. The balance may be maintained if a removed inventory item is replaced by one of equivalent value in credits.

In a further embodiment, the invention is a method for providing a plurality of end users with the ability to engage in the swap of a plurality of products comprising the following steps: providing a system for the entry of a plurality of items into inventory of a system by the a plurality of end users; providing a fixed number of credits for each said item entered which can be then used to obtain other items in the system's inventory wherein the umber of credits received for each item will be automatically set by the system depending on each item's characteristics and where the total number of credits allocated represent the total value of all entered items.

DETAILED DESCRIPTION OF THE PRESENT INVENTION

The present invention is specifically directed to a comprehensive system for facilitating e-commerce, barter and exchange, which in one embodiment, is linked via a global computer network of which the Internet or Worldwide Web is merely exemplary. In a most preferred embodiment, the present invention is described in the context of a novel website and database driven technology called SwapCredits.com.

Figure 1:
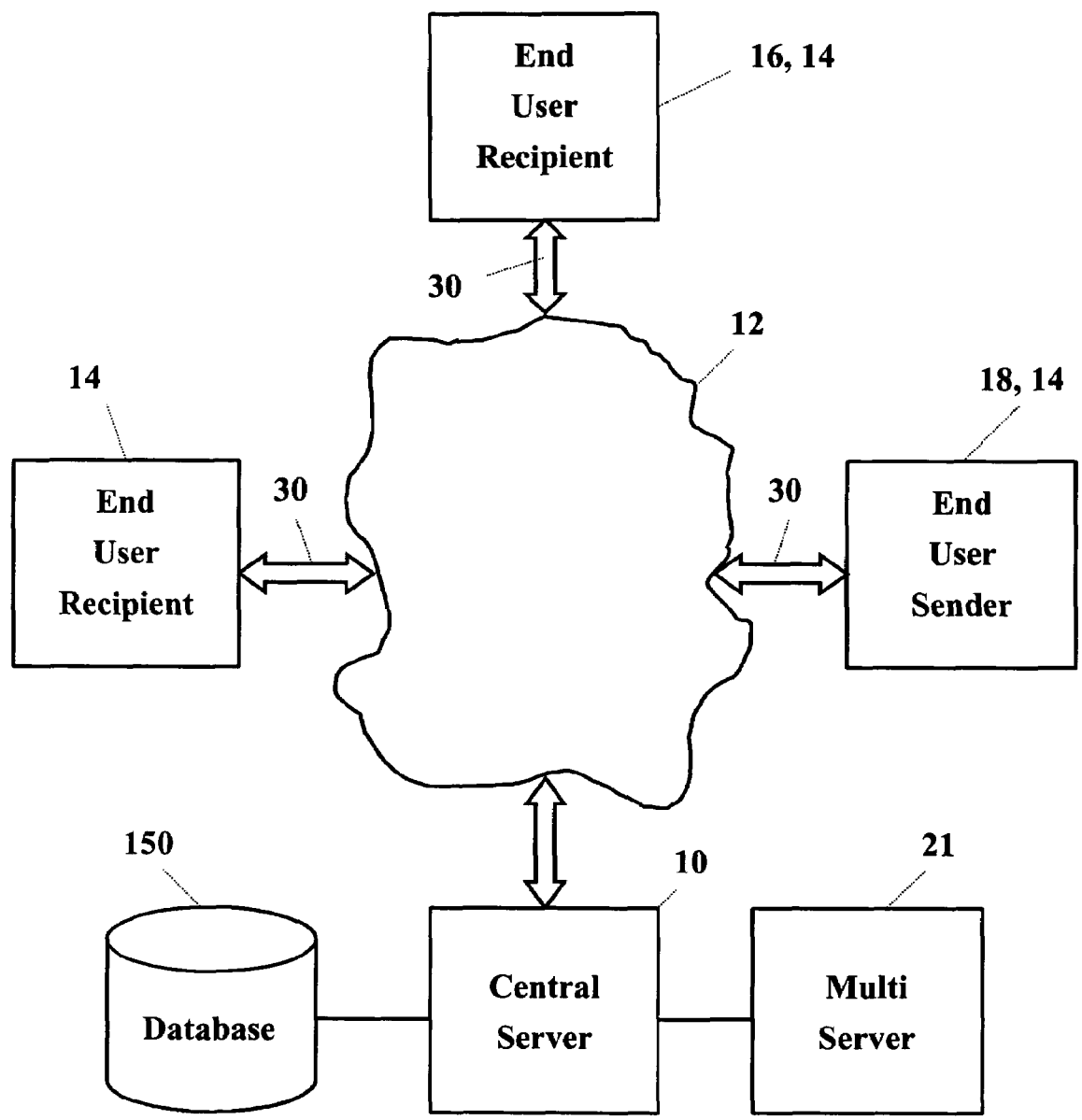
FIG. 1 is a block diagram of the e-commerce system in accordance with the present invention.

Referring to FIG. 1, a most preferred embodiment of the present invention is disclosed and shown. The most preferred embodiment comprises a central computer server 10 connected by a computer network 12 to remote end user stations 14. The central server connects to a database 150. In a preferred embodiment, end user stations 14 comprise a plurality of end user recipients 16 and senders (hereinafter users) 18 linked via a transport medium 30. The central server in one embodiment contributes a website such as www.SwapCredits.com.

End user recipients 16 and senders 18, as noted above, in a most preferred embodiment, will be linked via a global computer network 12 such as the Internet or Worldwide web, but other embodiments including LANs, WANs and Intranets, fulfill the spirit and scope of the present invention.

Both the recipient and sender end user systems 16, 18 will typically comprise any device that connects to the system via the Internet or other IP transport methods and includes, but is not limited to, such devices as televisions, computers, handheld devices, cellular phones, land based telephones, wireless electronic devices and any device which uses a transport medium 30. Non-limiting examples of a transport medium 30 applicable for use in the present invention comprise any backbone or link such as an ATM link, FDDI link, satellite link, cable, cellular, twisted pair, fiber optic, broadcast wireless network, the internet, the world wide web, local area network (LAN), wide area network (WAN), or any other kind of intranet environment such a standard Ethernet link. In such alternative cases, the clients will communicate with the system using protocols appropriate to the network to which that client is attached. All such embodiments and equivalents thereof are intended to be within the scope of the present invention.

Referring again to FIG. 1, the present invention may comprise a multi-server 21 environment which comprises a computer system in accordance with the present invention that allows the multiple users 16, 18 to communicate with one another via the system and system clients. Through communication link and transport medium 30, customer end users 16 will schedule ground transportation itineraries with ground transportation providers 18 who are linked to the central server 10, preferably by a customizable interface to be described in greater detail below.

Figure 2:
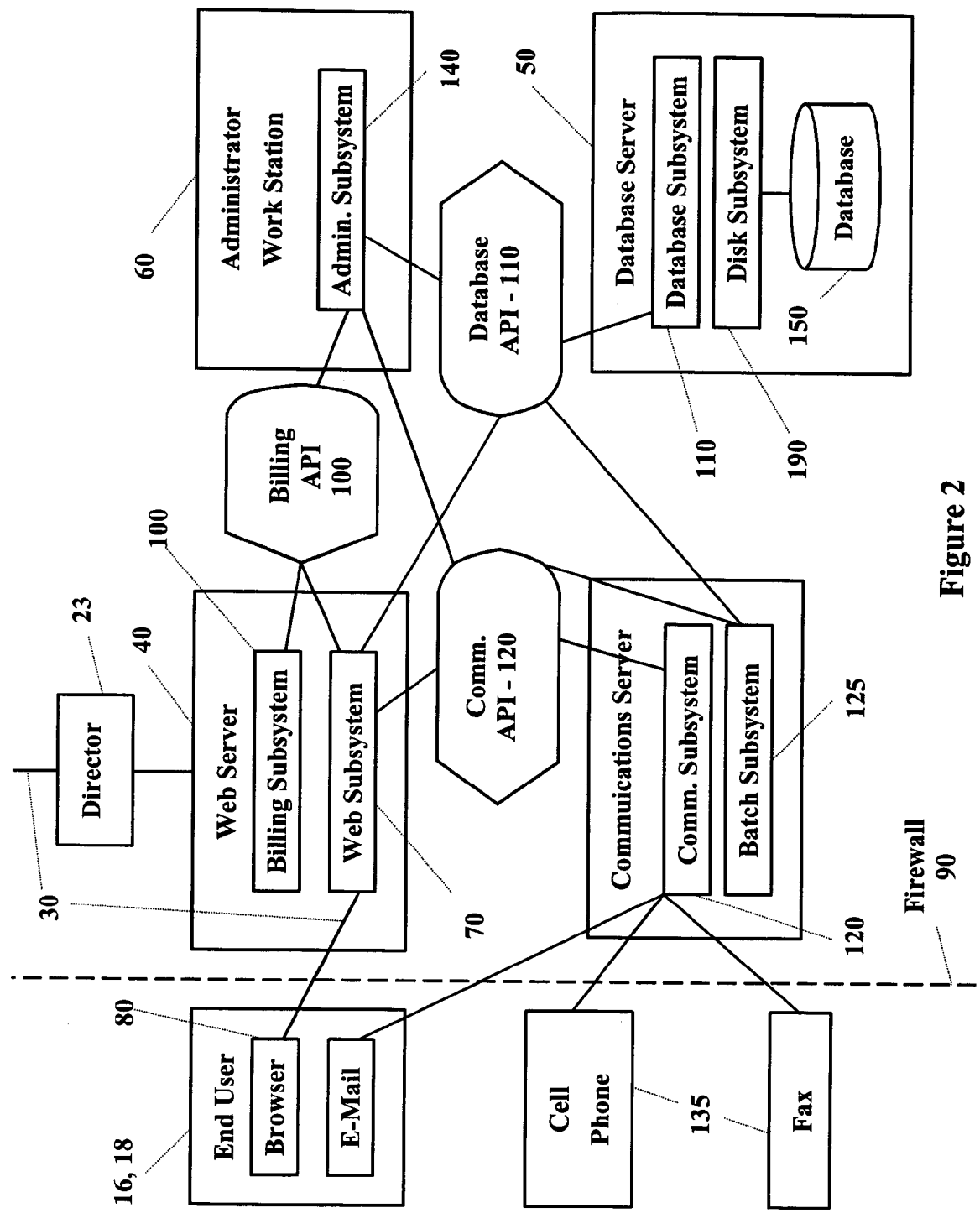
FIG. 2 is a block diagram of the end user and server systems in accordance with the present invention.
Figure 3:
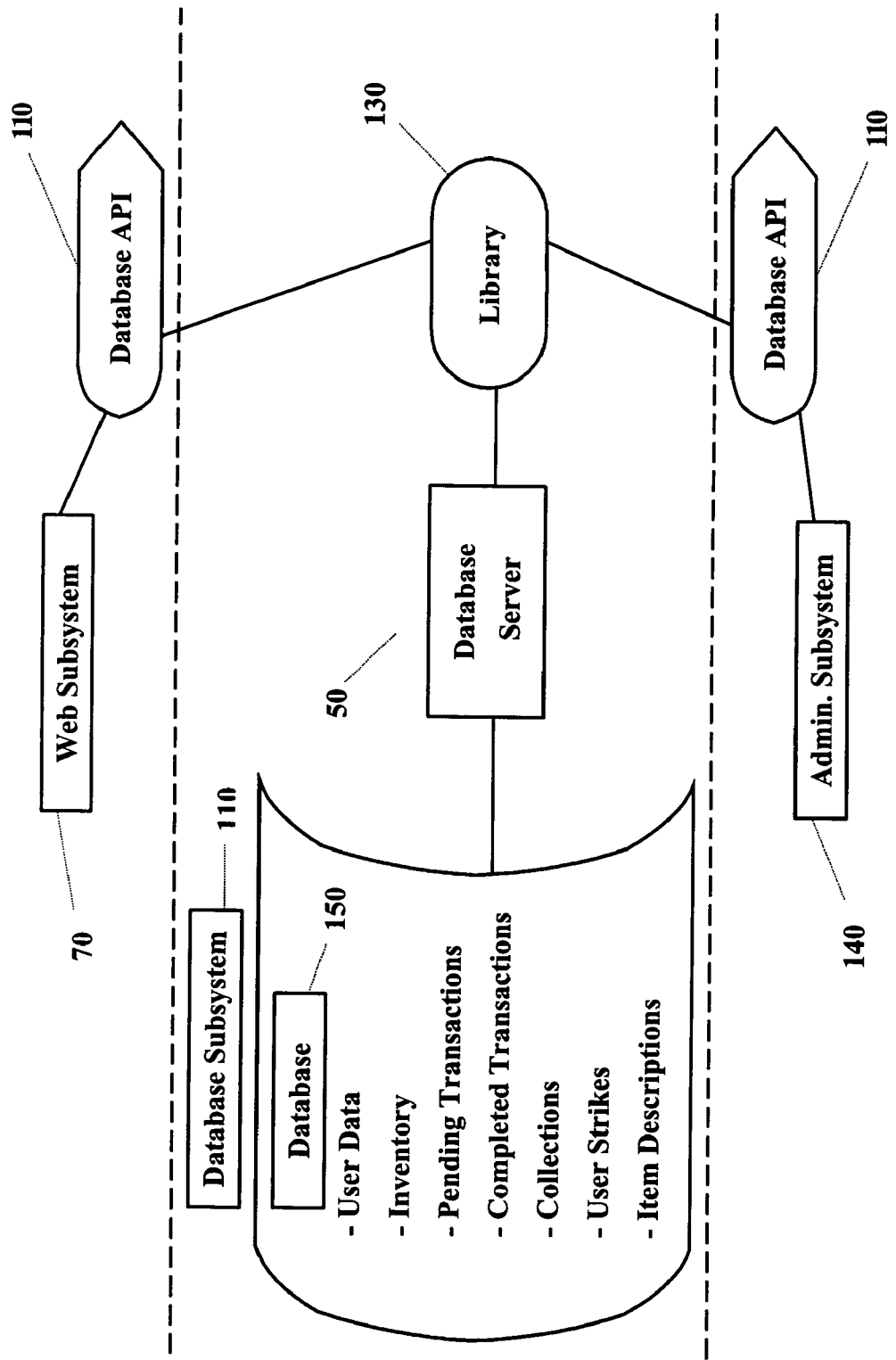
FIG. 3 illustrates the database architecture of the present invention.

Referring to FIGS. 2 and 3, the central server and database systems of the present invention are now shown and described in greater detail. A local director 23 routes signals through the system to the various servers, to be described below, and to and through transport medium 30 to end users 16, 18. The system preferably includes two primary servers, a web server 40 and a database server 50 which may operate using such database platforms as SQL server or Oracle. Hence, in one embodiment the SQL server may run SQL server database management software from Microsoft Corporation. Alternatively, the server can further comprise an Oracle database server.

The system further includes an administrative work station 60 or system which provides the administrative capabilities and monitoring for the system under the control of an administrative subsystem 140. The administrative work station 60 allows administrators or other operators to perform routine operations which affect the entire system.

Such operations include, but are not limited to, administering the accounts of both senders 18 and recipients 16, adding or deleting new users, the tabulation of swapcredit balances of users, printing reports and performing of backups and maintaining the programs that comprise the overall system A web subsystem 70 is responsible for all interactions with a web browser 80 in the end user devices 16, 18 and serves as the end user interface to the system. All interactions between the end user devices 16, 18 and the database subsystem occur through the web subsystem 70. Internet Information Server 200 (IIS) by Microsoft Corporation is an exemplary web server software system 70 in accordance with the present invention, although the present invention is in no way limited to this system. The expression of the user interface presented to end users 16, 18 in their client devices may be implemented as HTML or other high level computer language or technology, and may be displayed in a standard web browser including a wireless browser.

All systems listed above are preferably communicated via an Ethernet 100 base T network and a switching hub. In addition, a second isolated network segment will preferably exist between the web server 40 and the external communications hardware (e.g. internet router). Such a system will keep external traffic isolated from the internal network, as well as providing a dedicated connection between the web server 40 and the Internet for maximum throughput. The systems will have an initial configuration of random access memory for the web server 40 and preferably at least 128 megabits for the database server 50, both having the capability to expand.

The web server 40 is the point of entry to the entire system. The system determines the identity of the remote users 16, 18 and makes appropriate decisions while serving webpages to the users 16, 18. The web server 40 sends HTML or other high level computer language to the end user work stations 16, 18, validates passwords, sends logging and transaction information to the database server 50, and performs logical operations, thus behaving as a transactional server.

As noted above, in one embodiment, the server operating system may be a Windows NT server, a multi-platform operating system provided by Microsoft Corporation. The Sun Microsystems Solaris is an alternative embodiment. The server typically includes IIS, which is a completely integrated Internet application platform. IIS includes a high-performance web server, an application development environment, integrated full-text searching, multi-media streaming and site management tools. The security infrastructure is integrated within the server, thus enabling an easy-to-maintain and highly-secure web development and deployment environment.

The operators of the system may create, delete and update account information by utilizing the administrative subsystem 140 in administrator work station 60. A billing subsystem 100 is responsible for credit card, debit card or checking account verification and any necessary billing type functions.

Database 110, communication 120 and billing 100 subsystems thus execute essential services for the other parts of the system, and will therefore have well-defined application program interfaces (API) 110', 120', 100', as is well recognized by those with skill in the art. The system will preferably be protected for the Internet by a "firewall" 90 which is a safety precaution, and important with respect to the present invention due to the sensitive and confidential nature of some of the material in the database.

In a preferred embodiment, the database subsystem 110 stores all pertinent information pertaining to buyer and seller accounts, transactions, and account history as well as general dynamic system information. All interactions with the database subsystem 110 are performed through a database API 110' which may define the interface to a library of stored procedures 130. These are used to implement high-level database functions and to shield the details of the database implementation from the other subsystems. The database subsystem 110 is preferably implemented using database server 50. The database contains such information as user information, inventory, pending transactions, completed transactions, incomplete transactions and collections and item descriptions.

The administration subsystem 140 provides an interface for operators and managers of the system to modify the database, print reports, view system data and log user information. The administration subsystem 140 provides a collection of access forms, queries, reports and modules to implement the administration interface. Administrators typically will have the power within the system to force most actions. The administration subsystem 140 will interact with the communications, database and billing subsystems.

The communications subsystem 120 interfaced to a communications API 120' will be used to notify both recipients and senders 16, 18. Users 16, 18 may be notified by phone, fax, email or pager, or other communications devices which can be contacted by the system 135. Some portable telephones and pagers include email addresses and so may be contacted by the email system; other users have only phone numbers. Other interfaces may be utilized as the application so demands.

A batch subsystem 125 may periodically send out grouped notifications. It will access the database subsystem 110 to determine what notifications are required, and uses the communication subsystem 120 to make those notifications. The billing subsystem 100 may be used to verify and bill credit cards, where applicable, and communicate through the billing API 100' to the administration subsystem 140, and potentially to an outside billing and verification service which could be used to perform the billing functions.

Referring to FIG. 3, the database server 50 which implements the database subsystem 110 of the present invention comprises a server that maintains all associated logging and transaction information for the system. Through the database 150 (which is backed up by a backup database for safety purposes), the database server 50 logs recipient and sender setup and account creation information, stores inventory, maintains and tabulates transactions and collections, hosts backup operations and performs statistical calculations for the entire system.

The database server 50 is preferably a dual processor computer microprocessor. Each connection to the database 150 and its associated work may be handled by a separate thread within the database server 50 processor space. It is anticipated that a dual processor machine is sufficient for the type and amount of transactions that it will be performing, however if it proves insufficient, the database can be "striped" to two or more machines to distribute the server load.

The disk subsystem 190 of the database server may comprise a vulnerable and crucial server element. Due to the mission critical design of the subsystem, it is preferable to utilize a Level 5 RAID. RAID is an alternative to standard SCSI hard disk drives. A RAID system provides automatic recovery from hard drive failures. Level 5 RAID systems provide the best balance between cost and level of data protection. A Level 5 RAID system uses multiple hard disk drives, on which the stored data is recorded redundantly using a scheme by which the data on the disk can be reconstructed if one of the disk drive units in the RAID fails. In the event of failure, the failed drive can be removed from the RAID system while it is still operating, and a replacement drive can be installed. The RAID system will regenerate the data and return itself to full protection capability. The data sorted on the disk subsystem remains available for normal processing, that is, from the time the drive fails to the time the RAID system is returned to full protection capability. Other levels of RAID which are less costly do not offer this type of data availability and could translate into costly system downtime.

Statistical calculations will be performed by the database server 50, along with other types of report generation. Specifically, IIS can log directly to an Open Database Connectivity (ODBC) standard data source. This makes the availability of the data collected by the database server about client activity on the system more readily available and easier to process into logical reports. Preferably the database server system is configured with a dual P6 CPU, 128 MB ECC, having sufficient ECC RAM, a graphics adapter capable of showing 1024×768 pixels with a depth of 8 bits, a 15 inch monitor, a PCI Fast/Wide SCSI-2 I/0 adapter, one PCI 100base T Ethernet adapter, a keyboard and a mouse, a 3.5 inch floppy drive, a CD ROM Drive, a disk drive, a 2 GB PCI Fast/Wide SCSI-2 hard disk drive, two 9 GB PCI Fast/Wide SCSI hard drives (Level 1) or an 8 GB RAID Subsystem (Level 5), and a 24 GB DAT SCSI (2 MB per minute) tape back-up unit.

In one embodiment, there will be one operator workstation 60 used for administering the system. As the need for additional workstations arises, additional operator workstations can be added by adding additional computer systems, installing the administration software and connecting them to the LAN. Operator workstation machines preferably utilize a Windows operating environment manufactured by Microsoft Corporation.

With the aforesaid operational background, the present invention is now described in the context of the following which sets forth the operation of the present invention:

I. SwapCredits and Inventory are Freely Exchanged

Users 16, 18 post books, CDs and videos on a SwapCredits.Com website, and in return, receive trading power in a form of virtual currency that will be described herein as trading credits or SwapCredits—a fixed number of credits for each item of inventory entered. SwapCredits are then used to obtain other items in the system's database (with the exception of those items designated for "Sale Only" for which only cash will be accepted by the listing party). The number of SwapCredits received for each item will be automatically set by the system depending on the item's characteristics (see SwapSetter™ at Section XVIII, below).

A. Inventory and SwapCredits are Designed to be in Balance

The system is designed to maintain balance between (1) inventory and (2) the total number of SwapCredits in all users' accounts combined. This is necessary so that neither trading power (SwapCredits) nor inventory is diluted. In order to maintain this balance, any time an inventory item is removed from the database, the equivalent number of SwapCredits must also be removed from a user's account. Alternatively, the balance may be maintained if a removed inventory item is replaced by one of equivalent value in SwapCredits. And while it is a requirement that the system as a whole be in balance, there is no requirement that a user's account be in balance (see Section VI, below).

B. EXAMPLE 1

System in Balance

Suppose Users A, B and C enter items into the SwapCredits.Com system, each item worth 5 SwapCredits. User A enters Video 1, Video 2 and Video 3. User B enters Book 1, Book 2 and Book 3. User C enters CD 1 and CD 2. Users A and B each receive 15 SwapCredits for the three items entered (at five SwapCredits each) and User C earns 10 SwapCredits for the two items entered (at 5 SwapCredits each). A, B and C may then use their SwapCredits to obtain items entered by the other users. Before any transactions are completed, the database would look like:

| | Inventory | | User Balances |
|---|---|---|---|
| User A | Video 1—5 SwapCredits | | User A |
| User A | Video 2—5 SwapCredits | | 15 SwapCredits |
| User A | Video 3—5 SwapCredits | ↑ | |
| User B | Book 1—5 SwapCredits | 40 | User B |
| User B | Book 2—5 SwapCredits | SwapCredits | 15 SwapCredits |
| User B | Book 3—5 SwapCredits | ↓ | |
| User C | CD 1—5 SwapCredits | | User C |
| User C | CD 2—5 SwapCredits | | 10 SwapCredits |

Note that the total number of SwapCredits for all users combined is 40 and that is exactly the number of SwapCredits in inventory value (8 items at 5 SwapCredits each). The system will maintain this balance. Any time an item is removed from the left side (inventory) the equivalent number of SwapCredits must also be removed form the right side (trading power) or, alternatively, a substitute inventory item of equivalent value in SwapCredits is entered.

C. EXAMPLE 2

After A Trade, the System Remains in Balance

Suppose A in Example 1, above, uses 5 SwapCredits to obtain CD 1 from user C. The system will remove the listing for inventory item CD 1 and will also remove 5 SwapCredits from A's account. After this transaction, the database will look like:

| | Inventory | | User Balances |
|---|---|---|---|
| User A | Video 1—5 SwapCredits | | User A |
| User A | Video 2—5 SwapCredits | | 10 SwapCredits |
| User A | Video 3—5 SwapCredits | ↑ | |
| User B | Book 1—5 SwapCredits | 35 | User B |
| User B | Book 2—5 SwapCredits | SwapCredits | 15 SwapCredits |
| User B | Book 3—5 SwapCredits | ↓ | |
| User C | CD 2—5 SwapCredits | | User C |
| | | | 10 SwapCredits |

The system is still in balance because now there are 35 SwapCredits in Trading power (right side) balanced by 35 SwapCredits of inventory (7 items valued at 5 SwapCredits each. Note that although C no longer has CD 2 in inventory (because it was sent to A), C still has 10 SwapCredits to use.

II. The System Operates at "Full Velocity"—SwapCredits are Awarded Instantly for Qualified Posted Inventory
  (1) SwapCredits are awarded instantly for qualified inventory and may be used immediately to obtain items listed by other users.
  (2) There is no limit to the number of SwapCredits a user can receive for listing qualified inventory.

Each user is permitted to immediately use SwapCredits based on the security provided by a credit card or a cash deposit which will provide a vehicle for addressing users who do not fulfill their obligations or whose inventory becomes stale and must be removed. (See Sections VII, X, below.)

III. Users are Obligated to Ship Inventory They've Listed

In exchange for receiving SwapCredits (trading power), the user promises to send to others the items the user listed to earn the SwapCredits. The user's right (to use SwapCredits) is balanced by the user's obligation (to ship inventory). When others want the items the user has listed, the user will be notified by E-Mail and must ship the item(s) within a fixed period. Charges apply for failing to comply.

IV. EXAMPLE 3

User A Posts Items and Receives SwapCredits

Suppose User A posts five items to the database: two CD's, two books, and one video. Assuming A receives five SwapCredits for each item, A will immediately earn 25 SwapCredits. The "full velocity" nature of the system will permit A to use these SwapCredits immediately to obtain items posted in the database by other users.

A's account will consist of two parts: (1) A's inventory (the items A agrees to send to others if called upon); and (2) A's balance of unused SwapCredits.

A's account will look like:

User A's Account

| User A's Account | |
|---|---|
| Inventory | Balance |
| CD 1—5 SwapCredits | |
| CD 2—5 SwapCredits | |
| Book 1—5 SwapCredits | 25 SwapCredits |
| Book 2—5 SwapCredits | |
| Video 1—5 SwapCredits | |

V. A User's Account Begins in Balance

A user's account begins in balance, that is the user's inventory and SwapCredits are equal. In Example 3, above, User A has 25 SwapCredits (trading power) balanced by the obligation to ship 25 SwapCredits of inventory (five items worth five credits each). Therefore, A's account is in balance.

VI. Over Time, a User's Account may be Out of Balance—Surplus or Deficit

A user's account remains in balance when the value of a user's unshipped inventory (in SwapCredits) is the equivalent of the user's unused SwapCredits. However, once a user begins trading, it is likely that his or her account will be out of balance, that is, it may have a surplus or a deficit. While it is acceptable for a user's account to have a surplus or deficit, the entire system will always be in balance (see Section I(A), above).

A. EXAMPLE 4

User A's Account Stays in Balance after 2 Transactions

Suppose User A from Example 3 (25 unused SwapCredits and unshipped inventory worth 25 SwapCredits) obtains one book, using five SwapCredits, and sends CD 1 to another user. A's account would now look like this:

User A's Account

| User A's Account | |
|---|---|
| Inventory | Balance |
| CD 2—5 SwapCredits | |
| Book 1—5 SwapCredits | 20 SwapCredits |
| Book 2—5 SwapCredits | |
| Video 1—5 SwapCredits | |

A now no longer has CD 1 in inventory because it was shipped to another user. A has also used 5 SwapCredits to obtain a book from another user. To account for these two transactions, the system removed CD1 from A's account and reduced A's balance of SwapCredits from 25 to 20. A's account is still in balance because A's obligation to ship 20 SwapCredits of inventory equals A's 20 unused SwapCredits (trading power).

B. Users have a Surplus when Unused SwapCredits Exceed Inventory

Some users will find that they ship inventory faster than they are using SwapCredits. In this instance the user will have a surplus, that is an excess of trading power over the obligation to ship inventory. Such a surplus is acceptable and may be maintained indefinitely by the user.

1. EXAMPLE 5

User A has a Surplus

Assume user A receives 25 SwapCredits in exchange for listing two CD's, two books, and one video as in Example 3. The chart in Example 3 shows what A's account looks like before any transactions are done. Now, suppose that A does not use any SwapCredits but ships four items to others, all but Video 1. A now has a surplus of 20 SwapCredits.

User A's Account

| User A's Account | |
|---|---|
| Inventory | Balance |
| ↑ 20 Surplus SwapCredits ↓ Video 1—5 SwapCredits | 25 SwapCredits |

In this example, the system has removed the items of inventory A has shipped but has not removed any SwapCredits because A has not yet used any. Here, A is "ahead of" the system. A has done his part before others have had to do theirs (to the extent of 20 SwapCredits) because A has shipped 20 SwapCredits of inventory and has not yet received anything in return.

2. EXAMPLE 6

User A's Surplus is Reduced by Using SwapCredits

The chart in Example 5 above shows what A's account looks like with a surplus of 20 SwapCredits. Now, suppose that A uses 10 SwapCredits to receive items and still maintains Video 1 in inventory (no one has requested it). A will now have 15 unused SwapCredits and a surplus of 10 SwapCredits. The surplus is the unused SwapCredits minus the value of unshipped inventory. Notice that the balance of SwapCredits is always equal to the value of unshipped inventory plus the surplus.

User A's Account

| User A's Account | |
|---|---|
| Inventory | Balance |
| ↑ 10 Surplus SwapCredits ↓ Video 1—5 SwapCredits | 15 SwapCredits |

In this example, the system has removed 10 of A's SwapCredits because A has exchanged them for items posted by other users. A is still "ahead of" the system by 10 SwapCredits, that is A still has a surplus of 10 SwapCredits.

C. A User has a Deficit when Inventory Exceeds Unused SwapCredits

While some users will ship inventory faster than they are using SwapCredits (e.g. have a surplus), other users will do the opposite and use SwapCredits faster than they ship inventory. In this instance the user will have a deficit, that is an excess of the obligation to ship inventory over unused SwapCredits (remaining trading power). It is acceptable to have a deficit, but as set forth below, older inventory items will be removed and it may be necessary for the user to "make up" the deficit at that time (see Section VII).

1. EXAMPLE 7

User A has a Deficit

Assume user A receives 25 SwapCredits in exchange for listing two CD's, two books, and one video as in Example 3. The chart in Example 3 shows what A's account looks like before any transactions are done. Now, suppose that A uses 20 SwapCredits immediately but has not been called upon to ship any of A's inventory. A now has a deficit of 20 SwapCredits. A's account will look like:

User A's Account

| User A's Account | |
|---|---|
| Inventory | Balance |
| CD 1 - 5 SwapCredits | ↑ |
| CD 2 - 5 SwapCredits | ↑ |
| Book 1 - 5 SwapCredits | 20 Deficit Swap Credits |
| Book 2 - 5 SwapCredits | ↓ |
| Video 1 - 5 SwapCredits | 5 SwapCredits |

Here A is "behind" the system. Other users have done their part (shipped 20 SwapCredits of items to A) before A has done his part (shipped inventory to others). Notice that the deficit is equal to the value of unshipped inventory minus the amount of unused SwapCredits. Another way of looking at it is that unused SwapCredits plus the deficit equals the unshipped inventory.

2. EXAMPLE 8

User A's Deficit is Reduced by Shipping Inventory

The chart in Example 7 above shows what A's account looks like with a deficit of 20 SwapCredits. Now, suppose that A ships Book 1 and CD 1 (collectively, worth 10 SwapCredits) and does not use the remaining 5 SwapCredits. A will now have a deficit of 10 SwapCredits. The deficit is the unshipped inventory minus the unused SwapCredits. Again, notice that the unshipped inventory is always equal to the unused SwapCredits plus the deficit.

User A's Account

| User A's Account | |
|---|---|
| Inventory | Balance |
| Book 2—5 SwapCredits | ↑ |
| CD 2—5 SwapCredits | 10 Deficit SwapCredits |
| Video 1—5 SwapCredits | ↓ |
|  | 5 SwapCredits |

In this example, the system has removed Book 1 and CD 1 because A has shipped them to another user. A is still "behind" the system by 10 SwapCredits, that is, A still has a deficit of 10 SwapCredits. The system remains in balance because the user who received the items had 10 SwapCredits removed from his/her account.

VII. Inventory will be Removed from the System after a Fixed Period

A fixed period from the date an item is posted to the database, it will be presumed that the item is undesirable and the user who posted the item will be given three options (with prior notice):

(1) The item will be removed along with the number of SwapCredits which had been awarded to the user for listing the item. (If the user does not have sufficient SwapCredits, the user will be offered only the following three options.)
(2) The user may pay a re-listing fee for each item to be removed in which case the item will be listed for one more year, but no additional extensions will be granted.
(3) The user may provide replacement inventory of equivalent value in SwapCredits.
(4) If the user does not have sufficient SwapCredits to remove along with the inventory item (and opts not to re-list the item or provide replacement inventory), the user must pay for the value of the removed items at a fixed rate per SwapCredit. (This option will not be available to users who have sufficient SwapCredits to remove along with the inventory item.)

A. When an Item is Removed, the System must be Adjusted so there is No Imbalance Because the system must remain balanced between trading power (total number of SwapCredits) and inventory items, if an item is removed an imbalance will occur. The preferred method of correcting that imbalance is to remove from the user the number of SwapCredits awarded to that user for having listed the item. The system would then be in balance because an inventory item and the equivalent number of SwapCredits will both have been removed. However, the system will also remain in balance if a replacement inventory item of equivalent value in SwapCredits is entered into the system by the user. Alternatively, paying the re-listing fee will keep the system in balance because the item will then not be removed. If, however, the user does not have sufficient SwapCredits left to remove along with the item (and the user does not wish to provide replacement inventory or re-list the item) the user must pay for the item's removal at a fixed rate per SwapCredit. SwapCredits.Com will then correct the imbalance by providing and listing replacement inventory because the user has not done so. The system will then be in balance.

B. A User may Choose to have the Item Removed along with the Equivalent Number of SwapCredits (to keep the System in Balance)

When the user is notified that an inventory item has been on the system too long, the user may choose to have the item removed along with the number of SwapCredits the user received when the item was first listed.

1. EXAMPLE 9

Inventory Removed along with SwapCredits

Suppose, over a period of time, User A enters five items in inventory (four books and one CD, each worth five SwapCredits), receiving 25 SwapCredits for those items. A then uses 15 SwapCredits to obtain items from other users and has 10 unused SwapCredits. A's account would look like:

User A's Account

| User A's Account | |
|---|---|
| Inventory | Balance |
| Book 1—5 SwapCredits | ↑ |
| Book 2—5 SwapCredits | 15 Deficit SwapCredits |
| Book 3—5 SwapCredits | ↓ |
| Book 4—5 SwapCredits | 10 SwapCredits |
| CD 1—5 SwapCredits | |

A entered CD 1 and Books 2, 3 and 4 recently, but Book 1 was entered some time ago. A is notified that the listing for Book 1 is too old and A chooses to have Book 1 removed along with the 5 SwapCredits A received for the listing. A's account will now look like:

User A's Account

| User A's Account | |
|---|---|
| Inventory | Balance |
| Book 2—5 SwapCredits | ↑ |
| Book 3—5 SwapCredits | 15 Deficit SwapCredits |
| Book 4—5 SwapCredits | ↓ |
| CD 1—5 SwapCredits | 5 SwapCredits |

The system remains in balance because the item and its equivalent in SwapCredits have both been removed.

C. A User may Choose to Pay a Re-Listing Fee to have the Item Remain on the System for an Additional Period Instead of having the item removed, a user may choose to pay to have the item re-listed for another fixed period. However, the item may be re-listed for only one additional period. If the item has not been requested by another user by that time, it will be removed permanently.

D. A User may have the Item Removed and Provide Replacement Inventory of Equivalent Value in SwapCredits Instead of having SwapCredits removed from the user's account, the user may choose to provide replacement inventory of equivalent value. This will keep the system in balance.

1. EXAMPLE 10

User A Provides Replacement Inventory

Suppose User A has five items in inventory (four books and one CD, each worth five SwapCredits) and 10 unused SwapCredits. A's account would look like the first chart in Example 9. Now, A has been informed that Book 1 has been on the system too long. Instead of having SwapCredits removed, A chooses to provide a different inventory item of equivalent value to replace Book 1. A enters Book 5 which is also worth 5 SwapCredits. A's account now looks like:

User A's Account

| User A's Account | |
|---|---|
| Inventory | Balance |
| Book 5—5 SwapCredits | ↑ |
| Book 2—5 SwapCredits | 15 Deficit SwapCredits |
| Book 3—5 SwapCredits | ↓ |
| Book 4—5 SwapCredits | 10 SwapCredits |
| CD 1—5 SwapCredits | |

A's account looks just like it did before except that Book 5 has been substituted for Book 1. A entered Book 5 which was worth 5 SwapCredits, the same value as Book 1 which was removed. Alternatively, A could have entered several items, and to the extent their value exceeded the value of Book 1 (5 SwapCredits), A's SwapCredit balance would be increased.

E. If a User does Not have Sufficient SwapCredits to Remove Along with an Inventory Item, the User Must Pay for Removing the Item at a Fixed Rate per SwapCredit If a user does not have sufficient SwapCredits to remove along with an item (and the user chooses not to provide replacement inventory or pay a re-listing fee) the user will pay for removing the item at a fixed rate per SwapCredit. SwapCredits.Com will then provide replacement inventory. In order to keep the system in balance (equivalent inventory and SwapCredits) when inventory is removed, the equivalent number of SwapCredits must also be removed. However, when a user has no SwapCredits to remove, in order to balance the system, replacement inventory must be provided. If the user chooses not to do so, SwapCredits.Com must do so in the user's place.

1. EXAMPLE 11

User A Pays for Removed Inventory

Suppose User A has five items in inventory (four books and one CD, each worth five SwapCredits). A has used all of the 25 SwapCredits and received items from other users. A has received full value from the system and has only the obligation to ship inventory remaining. A's account would look like:

User A's Account

| User A's Account | |
|---|---|
| Inventory | Balance |
| Book 1—5 SwapCredits | |
| Book 2—5 SwapCredits | ↑ |
| Book 3—5 SwapCredits | 25 Deficit SwapCredits |
| Book 4—5 SwapCredits | ↓ |
| CD 1—5 SwapCredits | |

Now, A has been informed that Book 1 has been on the system too long. (Books 2, 3 and 4 and CD 1 were entered more recently). A has no SwapCredits to remove and chooses not to provide replacement inventory or pay a re-listing fee. A must now pay for the 5 SwapCredits. To keep the system in balance, the item should be removed along with the equivalent number of SwapCredits, but since there are none, A pays for those SwapCredits. To keep the system in balance replacement inventory must be provided. A replacement inventory provider will supply another listing on the system so that the balance is maintained. A's account now looks like:

User A's Account

| User A's Account | |
|---|---|
| Inventory | Balance |
| Book 2—5 SwapCredits | |
| Book 3—5 SwapCredits | ↑ |
| Book 4—5 SwapCredits | 20 Deficit SwapCredits |
| CD 1—5 SwapCredits | ↓ |

VIII. User Accounts will List Unused SwapCredits and any Deficit or Surplus

Each user's account will list not only the number of unused SwapCredits but also if there is any deficit or surplus. When the user decides to use SwapCredits to obtain inventory, if there is a deficit the user will be reminded that he/she may be called upon to make up that deficit if his/her inventory does not move within the required fixed period (but only if the user doesn't have sufficient SwapCredits to remove along with the item and chooses not to provide replacement inventory). The option of re-listing the item for a fee will also be explained.

IX. Users will have a Cash Account

In addition to SwapCredit balances, each user will also have a cash balance account. When a user ships items to others, the user's cash balance will increase by the amount the user spends for postage (see Section XI, below). Cash balance accounts will also increase by amounts received for the sale of items (see Section XVII, below). The cash balance will be decreased by charges levied on users such as transaction fees (see Section XII(B)), re-listing fees (see Section VII(C)), deficit payment fees (see Section VII(E)) and any other charges. If a membership fee is instituted, the cash balance account will be debited for this fee as well (see Section XII(A)).

A. The User may Request a Check be Issued from the Cash Account

When the account value exceeds a fixed amount, the user may request a check for any amounts in excess thereof, but only in fixed increments in excess of the minimum.

B. The System will Charge the Cash Account Before the Credit Card

When a user is to be given a credit, the credit will increase the user's cash account. When charges are to be levied, the cash balance account will be reduced. Only if the balance is insufficient will the credit card be charged.

X. Credit Card Security or a Cash Deposit is Required

When a user establishes an account, a credit card number will be required to secure the user's obligations. Cards will be frequently checked to ensure that sufficient unused credit remains. A fixed period before the card expires, the user will be required to enter a new card number or re-establish the old card number. If neither is done, it will be treated as a terminated account (see Section XIV, below). Alternatively, a user may send a fixed cash deposit to start an account. Those funds will be used to secure the user's obligations. As the fund is depleted the user will be required to replenish it.

XI. Postage is Paid by the User Ordering the Item

The user obtaining items from the database will ultimately be responsible for the postage. The party shipping the item will pay for postage in the first instance but will receive a credit in his/her cash account so there is no net cost to him/her. The user requesting an item will have charged to his/her cash account (or credit card if the cash account is insufficient (see Section IX, above)) the amount for the postage in addition to a transaction fee (see Section XII(B), below). The shipper is not reimbursed for the cost of the envelope or packing materials.

A. Postage is Estimated by the System and may be Adjusted

When a user requests an item the user will be given a general range for the postage depending on the item type (books will vary most; CDs, VHS tapes and DVDs will vary little). The system will then create a pending transaction which will appear in both the requesting user's account and the shipping user's account. A hold will be placed on the requesting user's cash account for the estimated postage and transaction fee. When the item is mailed, the shipping user will enter into the system the exact amount of postage. At that time the requesting user's pending transaction will be adjusted with the exact amount of postage and the requesting user informed that the item has been shipped. When the user receives the item and indicates so, the transaction will be made final (cash balance account charged and/or credit card). If the user does not so indicate within a fixed period and after an E-mail requesting the status, it will be presumed that the user received the item and the transaction will be made final. The shipping user will then be given a credit in the cash account for the postage. If the requesting user does not receive the item, the transaction will be nullified as the risk of loss is on the sender (see Section XIII, below). If a requesting user has three losses in a fixed period of time from two or more other users, that user will have his/her account terminated.

XII. Membership Fees and Transaction Fees

A. For the First Year, There will be No Membership Fee

While there will be no membership fees at first, such fees may be instituted later.

B. A Charge Per Item will Apply

The party requesting items from the database will pay a fixed transaction fee per item.

C. For Sales, the Seller will Pay a Fixed Percentage as a Commission

For items listed for sale only (and not sale/swap) the party requesting the item will pay the postage and the item price. The party selling the item will pay a fixed percentage of the item's price (excluding postage) as a commission. Amounts will be removed from cash accounts and/or credit cards (see Section IX, above).

XIII. The Risk of Loss is on the Sender

The party shipping the item will bear the risk of loss. This is to give an incentive to package the item securely, properly address the package and make sure it is sent. The sender may choose to have the item insured (at his/her expense), and while the sender will be reimbursed for postage, the sender will not be reimbursed for the cost of insurance. If the item is lost, the sender will be reimbursed by the post office. Also, if an item is lost, it will be treated as removed inventory and the user will be given the same options as inventory removed after a year. (See Section VII, above.) If the item is not sent within three days, the transaction will be nullified and the party who failed to send the item will be charged a fee.

XIV. Terminated Accounts—Inventory Removed, Charges may Apply

An account may be terminated: (1) when a user chooses to do so; (2) when a credit card expires and no new card is entered in its place; (3) when a security deposit is fully utilized and the user does not replenish it; (4) when a user has three strikes from rules infractions (see Section XIX, below); or (5) when a user is deceased. A terminated account will be treated as though the remaining inventory is to be removed and may not be re-listed or substituted by replacement inventory. If there are sufficient SwapCredits to be removed along with the inventory, no charges will apply. If there are surplus SwapCredits, those will be forfeited. If there are deficit SwapCredits, the user will be charged at the fixed rate per SwapCredit plus an administrative fee. The user will be given two weeks to redeem any unused SwapCredits by posting sufficient security or a credit card number.

A. EXAMPLE 12

User A's Account, with Deficit SwapCredits, is Terminated for Failure to have a Valid Credit Card Suppose User A fails to post a valid replacement credit card. A's account looks like:

User A's Account

| User A's Account | |
| --- | --- |
| Inventory | Balance |
| Book 1—5 SwapCredits | ↑ |
| Book 2—5 SwapCredits | 15 Deficit SwapCredits |
| Book 3—5 SwapCredits | ↓ |
| Book 4—5 SwapCredits | 10 SwapCredits |
| CD 1—5 SwapCredits | |

Because A does not have proper security, A's account will be terminated. First, A's 10 unused SwapCredits will be removed along with 10 SwapCredits of inventory. But that still leaves A with a deficit of 15 SwapCredits. Before A's card expires, A's cash account will be charged for the 15 SwapCredits and the termination fee. If the cash account is insufficient the credit card will be charged. If A had had surplus credits, A would have forfeited them.

XV. EXAMPLE 13

Sample Transaction: User B Obtains an Item from User A

User A originally received 25 SwapCredits for listing 5 inventory items. A then used 10 SwapCredits to obtain items. No one has yet asked A to ship any items. A has a deficit of 10 SwapCredits. A's account looks like:

User A's Account

| Inventory | Balance |
| --- | --- |
| CD 1—5 SwapCredits | ↑ |
| CD 2—5 SwapCredits | 10 Deficit SwapCredits |
| Book 1—5 SwapCredits | ↓ |
| Book 2—5 SwapCredits | 15 SwapCredits |
| Book 3—5 SwapCredits | |

User B originally received 20 SwapCredits for listing 4 videos. B has not yet used any SwapCredits but was called upon to and shipped 2 videos to other users. B's account looks like:

User B's Account

| Inventory | Balance |
| --- | --- |
| ↑ | |
| 10 Surplus SwapCredits | |
| ↓ | 20 SwapCredits |
| Video 3—5 SwapCredits | |
| Video 4—5 SwapCredits | |

Next, B looks through the database and decides to use 5 SwapCredits to obtain Book 3 from User A. The system creates a "pending transaction" for Users B and A. User B has 5 SwapCredits held in suspension pending the successful completion of the transaction. The system generates an E-Mail to User A giving User A a fixed time to ship Book 3 to User B. The E-Mail provides B's address to User A. User A ships the book which costs $2.09 in postage. A indicates by communication through A's account that A shipped the book and that the postage was $2.09. B receives the book and notes that in B's account on the system. A is given a credit of $2.09 in A's account. B's cash account is charged $2.09 for the postage and the transaction fee. A's account now looks like:

User A's Account

| Inventory | Balance |
| --- | --- |
| CD 1—5 SwapCredits | ↑ |
| CD 2—5 SwapCredits | 5 Deficit SwapCredits |

-continued

User A's Account

| Inventory | Balance |
| --- | --- |
| Book 1—5 SwapCredits | ↓ |
| Book 2—5 SwapCredits | 15 SwapCredits |
| CASH BALANCE: $2.09 | |

Cash Balance: $2.09

The system removed Book 3 from A's account and also reduced A's deficit by 5 SwapCredits because A has fulfilled some of A's obligation to ship inventory. The removal of Book 3 from A's account is balanced by removing 5 SwapCredits from B's account. B's surplus is therefore reduced. Assuming that B had exactly the amount needed in his/her cash account, B's account now looks like:

User B's Account

User B's Account

| Inventory | Balance |
| --- | --- |
| ↑ | |
| 5 Surplus SwapCredits | |
| ↓ | 15 SwapCredits |
| Video 3—5 SwapCredits | |
| Video 4—5 SwapCredits | |
| CASH BALANCE: $0.00 | |

XVI. Items may be Listed for Sale Only

When a user enters items into the system, the user will be asked whether each item is offered (1) for swap only; (2) for swap or sale; or (3) for sale only. If an item is listed for sale only, that item's price will be set by the user (not by Swap-Setter™) and the user will not receive SwapCredits for the listing. SwapCredits may not be used to obtain an item offered for sale only. When a user wishes to buy an item, the cost for the item, the shipping charges and a fixed transaction fee are charged to the user's cash account and a pending transaction set up (see Section XI(A)). As with swaps, the user receiving the item pays for the postage. The seller will ship the item and will receive a dollar credit in his/her cash account for the purchase price and the postage less a fixed percentage commission.

XVII. Items may be Offered for Sale or Swap

Users who list items for sale/swap will receive SwapCredits for those items and may use those SwapCredits just as a user who listed an item for swap only. An item so listed must be sent to whomever requests it, whether for sale or swap. The listing user does not have the choice to reject a swap to wait for a sale or visa versa.

A. Equivalent SwapCredits must be Removed Along with an Item Listed for Sale or Swap In order to keep the system in balance, whenever an item is removed from inventory, the SwapCredits awarded for that item must also be removed. When an item is traded for SwapCredits, the party requesting the trade has his/her SwapCredits removed along with the item of inventory, keeping the system in balance. However, if an item listed for swap/sale (for which the listing user was awarded SwapCredits) is sold for cash, the number of SwapCredits must still be removed. In this instance, those SwapCredits must be removed from the listing party in order for the system to remain in balance. If he/she does not have sufficient SwapCredits, he/she may provide replacement inventory of an equivalent amount, or alternatively, he/she will forfeit the purchase price which will then be used by SwapCredits.Com to procure replacement inventory.

B. EXAMPLE 14

User A Swaps an Item which was Listed for Sale/Swap

Assume A lists four inventory items (two CDs and two books) all for swap/sale. A received 20 SwapCredits for these items and uses 10 SwapCredits to obtain two videos from other users. No one has yet asked A for any items. A has 10 deficit SwapCredits. A's account looks like:

User A's Account

| User A's Account | |
|---|---|
| Inventory | Balance |
| CD 1—5 SwapCredits | ↑ |
| CD 2—5 SwapCredits | 10 Deficit SwapCredits |
| Book 1—5 SwapCredits | ↓ |
| Book 2—5 SwapCredits | 10 SwapCredits |

Next, User B requests CD 1 as a swap. CD 1 will be removed from A's account, and the system will remain in balance because 5 SwapCredits will be removed from User B. A's account will now look like:

User A's Account

| User A's Account | |
|---|---|
| Inventory | Balance |
| CD 2—5 SwapCredits | ↑ |
| Book 1—5 SwapCredits | 5 Deficit SwapCredits |
| Book 2—5 SwapCredits | ↓ |
| | 10 SwapCredits |

C. EXAMPLE 15

User A Sells an Item which was Listed for Sale/Swap

Assume A lists four inventory items (two CDs and two books) all for swap or sale, as in Example 14, above. A's account looks just like the first chart in Example 14. Next, User B wants to buy CD 1 for $5 (5 SwapCredits=$5, assuming 1 SwapCredit=$1). Because SwapCredits and inventory must both be removed to keep the system in balance and no SwapCredits are being removed from B because B is paying cash, the SwapCredits must be removed from A. User A's account now looks like:

User A's Account

| User A's Account | |
|---|---|
| Inventory | Balance |
| CD 2—5 SwapCredits | ↑ |
| Book 1—5 SwapCredits | 10 Deficit SwapCredits |
| Book 2—5 SwapCredits | ↓ |
| | 5 SwapCredits |
| CASH BALANCE: $5.00 | |

Cash Balance: $5.00

The system removed CD 1 and also the 5 SwapCredits A had received for having listed the item. A was also awarded the $5.00 paid by B for CD 1.

D. If a User does not have Enough SwapCredits to Remove Along with Inventory Sold for Cash, the User may Provide Replacement Inventory or Forfeit the Cash If a user sells an item offered for sale/swap but does not have sufficient SwapCredits to remove along with the item, the system will not be in balance. The user will then have two options: (1) provide replacement inventory of equivalent value in SwapCredits and keep the cash; or (2) forfeit the cash in which case SwapCredits.Com will provide replacement inventory.

E. EXAMPLE 15

User A Sells an Item which was Listed for Sale/Swap but does Not have Enough SwapCredits Assume User A enters three books for sale/swap and receives 15 SwapCredits in return (5 SwapCredits for each item). A then uses all 15 SwapCredits to obtain items in the database from other users. No one has yet asked A to ship any inventory. A now has a deficit of 15 SwapCredits. A's account looks like:

User A's Account

| User A's Account | |
|---|---|
| Inventory | Balance |
| Book 1—5 SwapCredits | ↑ |
| Book 2—5 SwapCredits | 15 Deficit SwapCredits |
| Book 3—5 SwapCredits | ↓ |

Next, User B wants to purchase Book 1 for $5.00 (assuming 1 SwapCredit=$1). A ships Book 1 to B but does not have any SwapCredits to remove from his/her account. A could choose to prove replacement inventory of equivalent or greater value. A will then be awarded the cash. The system will remain in balance because the item of inventory removed is replaced by another item. If A chooses to add Book 4 (worth 5 SwapCredits) A's account will look like:

User A's Account

| User A's Account | |
|---|---|
| Inventory | Balance |
| Book 2—5 SwapCredits | ↑ |
| Book 3—5 SwapCredits | 15 Deficit SwapCredits |
| Book 4—5 SwapCredits | ↓ |
| CASH BALANCE: $5.00 | |

Cash Balance: $5.00

But, if instead, A chooses not to add replacement inventory, A will forfeit the $5.00. SwapCredits.Com will then provide replacement inventory to keep the system in balance. A's account will look like:

User A's Account

| User A's Account | |
|---|---|
| Inventory | Balance |
| Book 2—5 SwapCredits | ↑ |
| Book 3—5 SwapCredits | 10 Deficit SwapCredits |
| | ↓ |

XVIII. SwapSetter™ Automatically Values Items

When a user enters items into the database for swap or swap/sale, SwapSetter™ automatically values them. From menus, the user tells the system the type of item, description and certain questions about condition (CD, DVD, VHS Tape, Hardback Book, Soft Cover Book). The system will then set the number of SwapCredits to be awarded for the item. If the user does not wish to enter the item, the user may withdraw it or list it for sale only in which case he/she may ser his/her own price.

A. Users Set Their Own Prices for Items which are for Sale Only

Users who list items for sale only may set their own prices. This will account for specialty items and for users who do not wish to barter but only want to use the site as a vehicle to turn items into cash.

In this embodiment users can sell items with the ability to have their price fluctuate to match lower prices and retain listing priority.

1. System Description.

A. Buyers See Only One Listing Per Item. No matter how many of the same item are available, buyers on the internet see only a single listing and a single price.

B. Sellers Will Set Their Own Price With Assistance From The System

For each item entered by a seller, the seller will set the price. If one or more identical items of the type the seller is entering are already listed, the system will inform the seller as to the lowest price. If no other items are listed, the system will show the retail price. The system will have a maximum price the user may set. That maximum will be set by the System Administrator as a percentage of retail price and will vary by item type. The Administrator will also set a minimum price as percentage of retail price and will vary by item type. If all identical items of the type are set at a percent of retail above a percent (by item type) which is set by the Administrator, the system will search all the minimum prices and then display the item with the lowest price which has been first listed. In addition, the administrator will also set the minimum percentage of retail price and absolute amounts (by item type) below which neither the price can be set nor below which the lowest price match can be set.

C. The system will display to buyers the lowest price from among multiple identical items for multiple listings of the same item. The system will display to a seller only the lowest price as listed by all sellers.

D. The seller may choose to price match. Each seller may choose whether to price match for each item listed. After having set the price, if sellers desire to price match, they will enter the lowest price for which they are willing to sell the item. In addition to an absolute price, this may comprise a percentage reduction in price.

E. The system will display the lowest price at any given moment for an item when buyers are searching for an item. The system will display the lowest price for multiple identical items. If a seller has chosen to price match, the system will check to see if the lowest price of all other identical items is less than the minimum price the seller has chosen. If lower, the system will ignore the seller's item. If higher, then the price of the seller's item will qualify it to be the next item sold.

F. The system will offer for sale to a buyer an item which is the lowest price, and which was first listed. The system will not only look for the lowest priced item from among multiple listings of the same item, but will also look for the earliest listed. That is, the item which will be offered as the next for sale. If a seller has chosen to price match, the date the item was listed will be used to determine whether it will be the next item offered for sale. Thus, sellers will retain the priority of their listing for the item over later listed items assuming the seller has the lowest price. If all identical items are listed at prices above a percentage of retail or absolute amount set by the administrator (by item type), the system will not search for the lowest price from among the prices set by sellers, but will instead search the lower amounts set as price match settings and display the lowest priced item from among those prices for the earliest listing.

G. At any time prior to a sale, the seller may change the price and/or price matching options. At any time, the seller may choose to change the price of the item in absolute or percentage terms.

XIX. Three Strikes and You're Out

Although SwapCredits.Com is not responsible for the condition of items or misrepresentations made by users, if a particular user has four infractions within a year, his/her account will be terminated. The system is dependent on the honesty of users and their willingness to live up to their obligations, and users will be encouraged to report infractions of the rules. The first infraction will result in a warning but no strike issued. For second and later infractions, a user will earn one strike for misrepresenting the condition of an item and the reversal of the transaction. One strike will be levied for failing to ship an item when requested. Two lost items within six months will result in the shipping user earning one strike. In order to suspend the user's account the strikes must result from complaints by more than one person. Any strike more than a year old will not count.

A. No Strike for the First Infraction

The first infraction will result in a warning and a re-statement of the rules. Strikes will then be accrued for further rules violations.

XX. Users can Temporarily Suspend Their Inventory while on Vacation

If a user will be away, he/she can suspend inventory items for up to a month. Another user can still request those items, but will be informed as to when the item will be available and can choose to wait. Suspending items will not alter the fixed holding period for stale inventory.

XXI. The System will Accept only Qualified Inventory

A. Items must be VHS Tapes, DVDs, CDs or Books of Fair Quality or Better

Only video material in VHS or DVD format will be accepted. No beta tapes, other formats or laser discs may be listed. CDs may be entered but no cassette tapes or vinyl albums. No items of poor quality may be listed. These include videotapes which have portions with poor or no audio or poor video quality, CDs which skip or have any sections which cannot be listened to, or books with torn or no covers or which have distracting or substantial markings in them.

B. Users may not Offer Items Violating Copyright or Other Laws

Users are not permitted to copy movies, television programs, books or music and offer them for sale or trade. These items, and any other copies or stolen/bootlegged merchandise, would violate copyright and/or other laws and are not permitted. Any user caught listing any such merchandise will have his/her account terminated immediately and will be turned in to law enforcement authorities. The only items which may be sold and/or traded are those items authorized by the copyright holder and which the user purchased or received as a gift.

C. Certain Types of Items may Not be Listed

Hard cover and soft cover books may be entered, but no trade journals, catalogues, magazines, specialized trade, professional or academic volumes, or other specialized reference books may be listed. Textbooks are also prohibited. These items may, however, be listed for sale. No pornography or obscene material may be entered for trade or sale.

XXII. The System will Offer Collection Charts which Users may Download into Their Accounts As a marketing device, the system will suggest collections for users, e.g., the world's 10 best horror films, 5 best Humphrey Bogart films, 20 best mystery novels, The Complete Led Zeppelin, etc. A user may peruse suggested collections, download any they'd like to pursue and then check off the items on the list as they're obtained. The system will also automatically search for such items and will e-mail the user to let him/her know another item on the list is available. The user may also design his/her own "collection" and share the list with other users.

A. The System will Offer Users the Option to Package Their Items into Collections to make Them More Marketable For example, if a user is entering several James Bond movies, the system will suggest that the tapes be packaged and presented as a set (still providing a user the option of obtaining only one in order to maintain flexibility). The same will be true for a series of children's books.

B. The System will Offer Trading Advice

For example, mothers whose children are no longer toddlers will be advised to turn those old "Barney" and "Sesame Street" videos into videos more appropriate for their kids who are now older, e.g. "Pokémon," "Home Alone," etc.

C. The System will Offer Book/Movie/Soundtrack Combos

If a user orders a book and the system finds that the movie and/or soundtrack are available the system will offer those items to the user, and visa versa if the user orders the movie or soundtrack.

XXIII. The System will Offer Other Items Listed by the Same Shipper

When a user selects an item from the database, the system will advise the user that he/she may see all other items available form the same shipper (i.e. the user who entered the items and received SwapCredits in exchange for them). This way, the user may save postage by having more than one item sent at the same time and also may find that other items listed by the same user may be of interest.

XXIV. The System will be Composed of Eight Linked Databases

The eight databases (linked by program modules) which will comprise the SwapPower™ system are:
(1) User Information
(2) Inventory
(3) Pending Transactions
(4) Completed Transactions
(5) Incomplete Transactions
(6) Collections
(7) User Strikes
(8) Book, CD, Video Descriptions A. User Information Database This database contains information on each user: name, user ID, address, e-mail address, telephone number, unused SwapCredits, Deficit or Surplus SwapCredits; Cash Balance; SwapCredits in Suspension Pending Transactions; total number of transactions completed, total number of SwapCredits expended; Credit Card Number; Credit Card Expiration Date; Amount Holding On Credit Card; Number of Strikes; Lost Items.

B. Inventory Database

This database contains information on each item listed: Item Number; User Listing Item; Item Type; Item Category (e.g. mystery, jazz, etc.); Item Condition; Item Description; For Sale, Swap Or Sale/Swap; SwapCredit Value; Dollar Price (If For Sale); Date First Listed; If Re-Listed; For How Long In Suspension; If Item Is Subject To Pending Transaction.

C. Pending Transactions Database

This database lists all pending (not yet completed) transactions and has fields for: User Requesting Item; User Shipping Item; Item Number; SwapCredit Value; Dollar Value; Date Shipper Notified; Date Shipped; Amount of Postage.

D. Completed Transactions Database

This database lists all pending completed transactions and has fields for: Item Number; Item Type; Item Condition; Item Description; For Sale, Swap Or Sale/Swap; SwapCredit Value; Dollar Price (If For Sale); User Listing Item; Date First Listed; If Re-Listed; User Requesting Item; Date Received; Transaction Fee; Postage; Amount Charged to Credit Card.

E. Incomplete Transactions Database

This database lists all transactions which have failed for whatever reason and has fields for: Item Number; Item Type; Item Condition; Item Description; For Sale, Swap Or Sale/Swap; SwapCredit Value; Dollar Price (If For Sale); User Listing Item; Date First Listed; If Re-Listed; User Requesting Item; Why Transaction Failed; Amount Charged to Credit Card.

F. Collections Database

This database lists the collections subscribed to by each user and includes fields for: User Number, Collections Subscribed To; Items In Each Collection Received; Items Not Yet Received.

G. User Strikes

This database includes the user number, and for each strike, a description of the infraction and the user making the allegation.

H. Book, CD, Video Descriptions

This database is a lookup table for descriptions of books, CDs and videos. It allows the user to enter ISBN and/or UPC codes to pull up descriptions so the user does not have to type them into the system when entering inventory. This database will include images of the front cover of items.

XXV. SwapCredits does Not Guarantee Items or Condition

The site will not be responsible for nor a guarantor of an item's represented condition or that it will arrive intact or at all. A user who feels aggrieved will be limited to filing a complaint which will be listed as a strike against the allegedly offending user (see Section XIX, above). However, the users will guarantee that their items will be as represented and will arrive. SwapCredits.Com will enforce the guarantee but will not be responsible if unable to do so.

In a further embodiment, the system facilitates the price matching of used items sales, store front price matching, fluctuation and a priority internet selling system.

The present invention has been described with reference to the above detailed description. It is to be appreciated that the true nature and scope of the present invention is to be determined with reference to the claims that are appended hereto.

The invention claimed is:

1. A method of operating an electronic barter system for facilitating consumer to consumer bartering transactions, comprising:
    a first consumer user listing item(s) on the electronic barter system;
    the electronic barter system determining and awarding to said first consumer user an amount of barter credit for said listed item(s);
    the electronic barter system identifying at least one item that has been listed on said electronic barter system by other consumer user(s) that may be desirous to said first user;
    the first consumer user selecting a desired item via the electronic barter system;
    the electronic barter system permitting at least a portion of said barter credit to be used by said first consumer user toward the acquisition of said desired item, the electronic barter system permitting the first consumer user to acquire an item from another consumer user where it is not required that the other consumer user acquire any item from the first consumer user; and
    the electronic barter system communicating a request to the consumer user who listed the desired item that the consumer user who listed the desired item surrender said desired item.

2. The method of claim 1, wherein said system further provides one or more incentives to a consumer user who purchases an item and lists said item.

3. The method of claim 1, wherein the system groups items of a particular kind together and offers to consumer users only one available item of each particular kind.

4. The method of claim 3, wherein an item is determined to be of a particular kind by reference to the International Standard Book Number.

5. The method of claim 3, wherein an item is determined to be of a particular kind by reference to the Universal Product Code.

6. The method of claim 3, wherein said one available item offered is the earliest one listed.

7. The method of claim 1, wherein listing an item creates no immediate obligation on the part of the consumer user to surrender said item.

8. The method of claim 1, wherein a consumer user's unused barter credit is not required to be equal to the combined barter credit of all inventory items listed by said consumer user which have not been surrendered.

9. The method of claim 1, wherein the system determines when the consumer user must surrender an item.

10. The method of claim 1, wherein a consumer user's unused barter credit is transferred to the system when said consumer user's account is closed.

11. The method of claim 1, wherein the system is Internet based.

12. The method of claim 1, wherein communication between said consumer users and said system is at least partially conducted using a telephone.

13. The method of claim 1, wherein communication between said consumer users and said system is at least partially conducted using a wireless telephone.

14. The method of claim 1, wherein communication between said consumer users and said system is at least partially conducted using a portable communications device.

15. A method of operating an electronic barter system for facilitating consumer to consumer bartering transactions, comprising:
    a first consumer user listing item(s) on the electronic barter system;
    the electronic barter system determining and awarding to said first consumer user an amount of barter credit for said listed item(s);
    the electronic barter system identifying at least one item that has been listed on said electronic barter system by other user(s) that may be desirous to said first consumer user;
    the first consumer user selecting a desired item via the electronic barter system;
    the electronic barter system permitting at least a portion of said barter credit to be used by said first consumer user toward the acquisition of said desired item, the electronic barter system permitting the first consumer user to acquire an item from another consumer user where it is not required that the other consumer user acquire any item from the first consumer user;
    wherein the electronic barter system determines at least one condition under which a consumer user must give up possession of an item; and
    the electronic barter system communicating a request to the consumer user who listed the desired item that the consumer user who listed the desired item surrender said desired item under the at least one condition that was determined by the electronic barter system.

16. The method of claim 15, wherein the barter system groups items of a particular kind together and offers to consumer users only one available item of each particular kind.

17. The method of claim 16, wherein an item is determined to be of a particular kind by reference to the International Standard Book Number.

18. The method of claim 16, wherein an item is determined to be of a particular kind by reference to the Universal Product Code.

19. The method of claim 16, wherein said one available item offered is the earliest one entered into said inventory.

20. The method of claim 15, wherein entering an item into said inventory creates no immediate obligation on the part of the consumer user to surrender said item.

21. The method of claim 15, wherein there is more than one inventory.

22. The method of claim 15, wherein a consumer user's unused credits is not required to be equal to the combined total credits of all inventory items entered by said consumer user which have not been surrendered.

23. The method of claim 15, wherein a consumer user's unused credits are transferred to the system when said consumer user's account is closed.

24. The method of claim 15, wherein the electronic barter system is Internet based.

25. The method of claim 15, wherein communication between said consumer users and said system is at least partially conducted using a telephone.

26. The method of claim 15, wherein communication between said consumer users and said system is at least partially conducted using a portable communications device.

27. A method of operating an electronic barter system for facilitating consumer to consumer bartering transactions, comprising:
- a first consumer user listing item(s) on the electronic barter system;
- the electronic barter system determining and awarding to said first consumer user an amount of barter credit for said listed item(s);
- the electronic barter system identifying at least one item that has been listed on said electronic barter system by other user(s) that may be desirous to said first consumer user;
- the first consumer user selecting a desired item via the electronic barter system;
- the electronic barter system permitting at least a portion of said barter credit to be used by said first consumer user toward the acquisition of said desired item the electronic barter system permitting the first consumer user to acquire an item from another consumer user where it is not required that the other consumer user acquire any item from the first consumer user;
- wherein the electronic system determines when a consumer user must give up possession of an item; and
- wherein a consumer user's unused credits is not required to be equal to the combined total credits of all inventory items entered by said consumer user which have not been surrendered.

28. The method of claim 27, wherein the electronic barter system groups items of a particular kind together and offers to consumer users only one available item of each particular kind.

29. The method of claim 28, wherein an item is determined to be of a particular kind by reference to the International Standard Book Number.

30. The method of claim 28, wherein an item is determined to be of a particular kind by reference to the Universal Product Code.

31. The method of claim 27, wherein said one available item offered is the earliest one entered into said inventory.

32. The method of claim 27, wherein entering an item into said inventory creates no immediate obligation on the part of the user to surrender said item.

33. The method of claim 27, wherein there is more than one inventory.

34. The method of claim 27, wherein a consumer user's unused credits are transferred to the system when said consumer user's account is closed.

35. The method of claim 27, wherein the system is Internet based.

36. The method of claim 27, wherein communication between said consumer users and said system is at least partially conducted using a telephone.

37. The method of claim 27, wherein communication between said consumer users and said system is at least partially conducted using a portable communications device.

38. A method of operating an electronic barter system for facilitating consumer to consumer bartering transactions, comprising:
- a first consumer user listing item(s) on the electronic barter system;
- the electronic barter system determining and awarding to said first consumer user an amount of barter credit for said listed item(s);
- the electronic barter system identifying at least one item that has been listed on said electronic barter system by other consumer user(s) that may be desirous to said first consumer user;
- the first user selecting a desired item via the electronic barter system;
- the electronic barter system permitting at least a portion of said barter credit to be used by said first consumer user toward the acquisition of said desired item;
- the electronic barter system permitting the first consumer user to acquire an item from another consumer user where it is not required that the other consumer user acquire any item from the first consumer user; and
- where a consumer user's unused credits is not required to be equal to the combined total credits of all inventory items entered by said user which have not been surrendered.

39. The method of claim 38, wherein the electronic barter system groups items of a particular kind together and offers to users only one available item of each particular kind.

40. The method of claim 39, wherein an item is determined to be of a particular kind by reference to the International Standard Book Number.

41. The method of claim 39, wherein an item is determined to be of a particular kind by reference to the Universal Product Code.

42. The method of claim 38, wherein said one available item offered is the earliest one entered into said inventory.

43. The method of claim 38, wherein entering an item into said inventory creates no immediate obligation on the part of the user to surrender said item.

44. The method of claim 38, wherein there is more than one inventory.

45. The method of claim 38, wherein a consumer user's unused credits are transferred to the electronic system when said consumer user's account is closed.

46. The method of claim 38, wherein the system determines when a consumer user must give up possession of an item.

47. The method of claim 38, wherein the system is Internet based.

48. The method of claim 38, wherein communication between said consumer users and said system is at least partially conducted using a telephone.

49. The method of claim 38, wherein communication between said consumer users and said system is at least partially conducted using a portable communications device.

50. A method of operating an electronic barter system for facilitating consumer to consumer bartering transactions, comprising:
- a consumer user entering one or more items to be swapped into an inventory of an electronic barter system, wherein only items listed in one or more lookup databases may be entered;
- the electronic barter system determining and awarding to said consumer user an amount of barter credit for said listed item(s);
- the electronic barter system identifying to a first consumer user at least one item that has been listed on said electronic barter system that may be desirous to said first consumer user, wherein the electronic barter system groups items of a particular kind together and offers to the first user only one available item of each particular kind, where the particular kind is determined by reference to said one or more lookup databases and where all items of a particular kind are assigned the same number of credits;
- the first consumer user selecting a desired item via the electronic barter system;
- the electronic barter system permitting at least a portion of said barter credit to be used by said first consumer user toward the acquisition of said desired item; and
- the electronic barter system permitting the first consumer user to acquire an item from another consumer user where it is not required that the other consumer user acquire any item from the first consumer user.

51. The method of claim 50, wherein an item is determined to be of a particular kind by reference to the International Standard Book Number.

52. The method of claim 50, wherein an item is determined to be of a particular kind by reference to the Universal Product Code.

53. The method of claim 50, wherein entering an item into said inventory creates no immediate obligation on the part of the consumer user to surrender said item.

54. The method of claim 50, wherein there is more than one inventory.

55. The method of claim 51, wherein a user's unused credits is not required to be equal to the combined total credits of all inventory items entered by said consumer user which have not been surrendered.

56. The method of claim 50, wherein a consumer user may acquire an item from another consumer user where it is not required that said other user acquire any item from said consumer user.

57. The method of claim 50, wherein a consumer user's unused credits are transferred to the system when said consumer user's account is closed.

58. The method of claim 50, wherein the electronic barter system is Internet based.

59. The method of claim 50, wherein communication between said consumer users and said electronic barter system is at least partially conducted using a telephone.

60. The method of claim 50, wherein communication between said consumer users and said electronic barter system is at least partially conducted using a portable communications device.

61. A method of operating an electronic barter system for facilitating consumer to consumer bartering transactions, comprising:
- a first consumer user listing item(s) on the electronic barter system;
- the electronic barter system determining and awarding to said first consumer user an amount of barter credit for said listed item(s);
- the electronic barter system identifying at least one item that has been listed on said electronic barter system by other consumer user(s) that may be desirous to said first consumer user;
- the first consumer user selecting a desired item via the electronic barter system;
- the electronic barter system permitting at least a portion of said barter credit to be used by said first consumer user toward the acquisition of said desired item, wherein said first consumer user may acquire an item from another consumer user where it is not required that said other consumer user acquire any item from said first consumer user.

62. The method of claim 61, wherein the system groups items of a particular kind together and offers to consumer users only one available item of each particular kind.

63. The method of claim 62, wherein an item is determined to be of a particular kind by reference to the International Standard Book Number.

64. The method of claim 62, wherein an item is determined to be of a particular kind by reference to the Universal Product Code.

65. The method of claim 61, wherein said one available item offered is the earliest one entered into said inventory.

66. The method of claim 61, wherein entering an item into said inventory creates no immediate obligation on the part of the consumer user to surrender said item.

67. The method of claim 61, wherein there is more than one inventory.

68. The method of claim 61, wherein a consumer user's unused credits is not required to be equal to the combined total credits of all inventory items entered by said consumer user which have not been surrendered.

69. The method of claim 61, wherein a consumer user's unused credits are transferred to the system when said consumer user's account is closed.

70. The method of claim 61, wherein the system is Internet based.

71. The method of claim 61, wherein communication between said consumer users and said system is at least partially conducted using a telephone.

72. The method of claim 64, wherein communication between said consumer users and said system is at least partially conducted using a portable communications device.

73. A method of operating an electronic barter system for facilitating consumer to consumer bartering transactions, comprising:
- a first consumer user listing item(s) on the electronic barter system;
- the electronic barter system determining and awarding to said first consumer user an amount of barter credit for said listed item(s);
- the electronic barter system identifying at least one item that has been listed on said electronic barter system by other consumer user(s) that may be desirous to said first consumer user;
- the first user selecting a desired item via the electronic barter system;
- the electronic barter system permitting at least a portion of said barter credit to be used by said first consumer user toward the acquisition of said desired item, the electronic barter system permitting the first consumer user to acquire an item from another consumer user where it is not required that the other consumer user acquire any item from the first consumer user; and wherein said method comprises the electronic barter system estimating the cost of postage required to ship the item.

74. A method according to claim 73, wherein said method further comprises the system notifying the consumer user as to the cost of postage required to ship the item.

75. A method according to claim 73, wherein said method further comprises compensating the user for at least a portion of the cost of postage required to ship the item.

76. A method of operating an electronic barter system for facilitating consumer to consumer bartering transactions, comprising:

a first consumer user listing item(s) on the electronic barter system;

the electronic barter system determining and awarding to said first consumer user an amount of barter credit for said listed item(s);

the electronic barter system identifying at least one item that has been listed on said electronic barter system by other consumer user(s) that may be desirous to said first consumer user;

the first user selecting a desired item via the electronic barter system;

the electronic barter system permitting at least a portion of said barter credit to be used by said first consumer user toward the acquisition of said desired item, the electronic barter system permitting the first consumer user to acquire an item from another consumer user where it is not required that the other consumer user acquire any item from the first consumer user; and the electronic system monitoring user compliance with at least one consumer user obligation; and the system determining whether the consumer user may continue using the system in response to said monitoring.

77. A method according to claim 76, wherein said step of monitoring consumer user compliance comprises monitoring whether the consumer user has shipped an item of at least a specified minimum quality.

78. A method according to claim 76, wherein said step of monitoring consumer user compliance comprises monitoring whether the consumer user has shipped an item in timely fashion.

79. A method of operating an electronic barter system for facilitating consumer to consumer bartering transactions, comprising:

a first consumer user entering one or more items to be swapped into an inventory of an electronic barter system, wherein only items listed in one or more lookup databases may be entered;

the electronic barter system determining and awarding to said first consumer user an amount of barter credit for said listed item(s);

the electronic barter system identifying at least one item that has been listed on said electronic barter system by other consumer user(s) that may be desirous to said first consumer user;

the first consumer user selecting a desired item via the electronic barter system;

the electronic barter system permitting at least a portion of said barter credit to be used by said first consumer user toward the acquisition of said desired item;

wherein the electronic barter system communicates a request to the consumer user who listed the desired item that the consumer user who listed the desired item surrenders said desired item;

wherein a consumer user's unused credits is not required to be equal to the combined total credits of all inventory items entered by said consumer user which have not been surrendered;

wherein said first consumer user may acquire an item from another consumer user where it is not required that said other consumer user acquire any item from said first consumer user;

wherein said method comprises the electronic barter system estimating the cost of postage required to ship the item; and wherein the electronic system monitors consumer user compliance with at least one consumer user obligation; and the system determines whether the consumer user may continue using the system in response to said monitoring.

80. The method of claim 79, wherein the system groups items of a particular kind together and offers to consumer users only one available item of each particular kind.

81. The method of claim 80, wherein an item is determined to be of a particular kind by reference to the International Standard Book Number.

82. The method of claim 80, wherein an item is determined to be of a particular kind by reference to the Universal Product Code.

83. The method of claim 80, wherein said one available item offered is the earliest one entered into said inventory.

84. The method of claim 79, wherein entering an item into said inventory creates no immediate obligation on the part of the consumer user to surrender said item.

85. The method of claim 79, wherein there is more than one inventory.

86. The method of claim 79, wherein a consumer user's unused credits are transferred to the system when said user's account is closed.

87. The method of claim 79, wherein the system is Internet based.

88. The method of claim 79, wherein communication between said consumer users and said system is at least partially conducted using a telephone.

89. The method of claim 79, wherein communication between said consumer users and said system is at least partially conducted using a portable communications device.

* * * * *

UNITED STATES PATENT AND TRADEMARK OFFICE
CERTIFICATE OF CORRECTION

PATENT NO. : 7,769,637 B2
APPLICATION NO. : 10/085394
DATED : August 3, 2010
INVENTOR(S) : Jeffrey Batoff It is certified that error appears in the above-identified patent and that said Letters Patent is hereby corrected as shown below:

| | |
|---|---|
| Column 2, Line 34: | "with a at least" should read --with at least-- |
| Column 2, Line 39: | "purchase" should read --obtain-- |
| Column 2, Line 41: | "system" should read --the system-- |
| Column 2, Line 53: | "by the a plurality" should read --by a plurality-- |
| Column 2, Line 56: | "umber" should read --number-- |
| Column 3, Line 23: | "contributes" should read --constitutes-- |
| Column 3, Line 41: | "internet" should read --Internet-- |
| Column 6, Line 27: | "Preferably" should read --Preferably,-- |
| Column 8, Line 4: | "CD 2" should read --CD 1-- |
| Column 11, Line 42: | "A fixed period" should read --After a fixed period-- |
| Column 24, Line 34: | "Suspension" should read --Suspension;-- |
| Column 24, Line 35: | "completed" should read --completed;-- |
| Column 25, Claim 2, Line 61: | "purchases" should read --obtains-- |

Signed and Sealed this

Thirtieth Day of November, 2010

David J. Kappos
*Director of the United States Patent and Trademark Office*